(12) United States Patent
Kruckenberg et al.

(10) Patent No.: US 8,800,911 B2
(45) Date of Patent: Aug. 12, 2014

(54) LIGHTNING STRIKE PROTECTION

(71) Applicant: Rohr, Inc., Chula Vista, CA (US)

(72) Inventors: Teresa M. Kruckenberg, La Mesa, CA (US); Vijay V. Pujar, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/032,054

(22) Filed: Sep. 25, 2013

(65) Prior Publication Data

US 2014/0021295 A1    Jan. 23, 2014

Related U.S. Application Data

(62) Division of application No. 12/549,871, filed on Aug. 28, 2009, now Pat. No. 8,561,934.

(51) Int. Cl.
*B64D 45/02* (2006.01)

(52) U.S. Cl.
USPC .................. 244/1 A; 244/133; 244/123.1

(58) Field of Classification Search
USPC ................. 244/1 A, 133, 123.1, 119
See application file for complete search history.

(56) References Cited

U.S. PATENT DOCUMENTS

| | | | | |
|---|---|---|---|---|
| 5,225,265 | A * | 7/1993 | Prandy et al. | 428/138 |
| 5,370,921 | A * | 12/1994 | Cedarleaf | 428/138 |
| 7,729,100 | B2 * | 6/2010 | Llorente Gonzalez et al. | 361/220 |
| 2006/0060825 | A1 * | 3/2006 | Glatkowski | 252/500 |
| 2006/0078705 | A1 * | 4/2006 | Glatkowski et al. | 428/63 |
| 2006/0135677 | A1 * | 6/2006 | Huang et al. | 524/496 |
| 2006/0166003 | A1 * | 7/2006 | Khabashesku et al. | 428/413 |
| 2008/0145528 | A1 * | 6/2008 | Deng et al. | 427/180 |
| 2009/0140098 | A1 * | 6/2009 | Lengsfeld et al. | 244/121 |
| 2009/0186214 | A1 * | 7/2009 | Lafdi et al. | 428/336 |
| 2011/0017867 | A1 * | 1/2011 | Simmons et al. | 244/1 A |

* cited by examiner

*Primary Examiner* — Tien Dinh
*Assistant Examiner* — Justin Benedik
(74) *Attorney, Agent, or Firm* — Snell & Wilmer LLP

(57) ABSTRACT

A lightning strike protection material may include a fiber reinforced composite aircraft component including carbon fibers in a resin matrix. The carbon fibers may have a length greater than at least about 6 mm and include carbon nanotubes grown on the fibers, and the nanotubes may be substantially uniformly distributed on the fibers and have a length between about 1 and 100 microns. The nanotubes may decrease a surface resistance of the resin matrix.

4 Claims, 1 Drawing Sheet

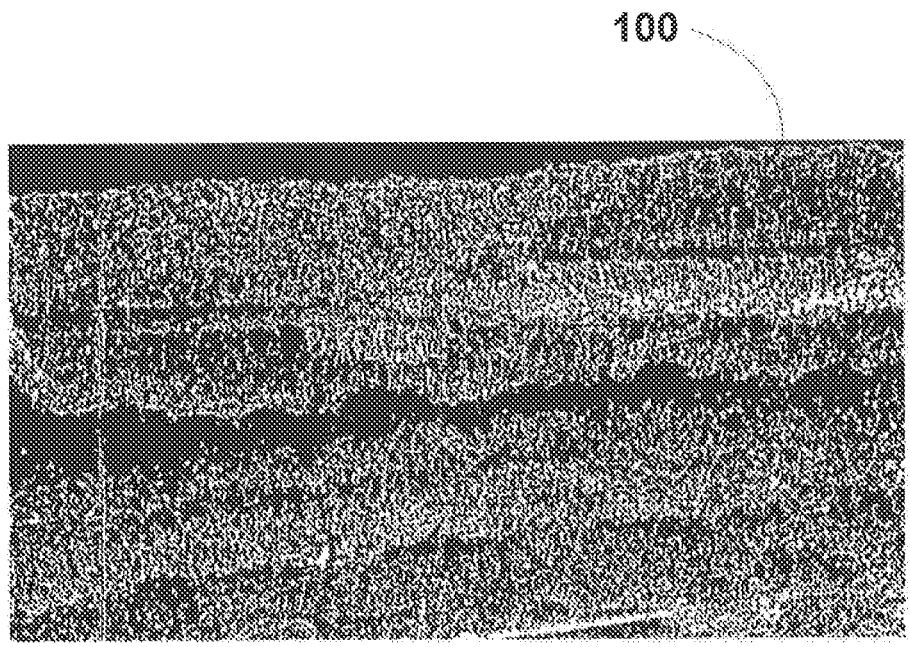

ial/wings/airship#lightning strike protection surface film

LIGHTNING STRIKE PROTECTION

CROSS-REFERENCE TO RELATED APPLICATIONS

This application is a divisional of and claims priority to U.S. application Ser. No. 12/549,871 entitled "Improved Lightning Strike Protection" and filed on Aug. 28, 2009, which is incorporated herein by reference in its entirety.

FIELD OF INVENTION

The technical field relates to aircraft and aircraft components, and more particularly relates to an improved lightning strike protection surface film for composite aircraft components and other composite structures.

BACKGROUND OF THE INVENTION

The outer surfaces of aircraft components such as fuselages, wings, tail fins, engine nacelles, and the like, are typically constructed from non-metal composite materials, aluminum, or hybrid materials that include a combination of composite materials and metal. When lightning strikes a metal outer skin of an aircraft, the metal skin provides a highly conductive path that permits an electrical current to pass across the metal skin from a lightning strike point to a lightning exit point without substantial damage to the surface of the aircraft. Many modern aircraft components such as engine nacelles, however, are constructed of strong but lightweight composite materials that help to minimize the overall weight of the aircraft. These composite materials often comprise carbon or graphite reinforcement fibers distributed within a polymeric matrix. Such composite structures typically are substantially less electrically conductive than metal structures, and are substantially less capable of distributing and dissipating electrical energy resulting from a lightning strike. Accordingly, external surfaces of such composite aircraft components often include lightning strike protection that provides a highly conductive electrical path along their external surfaces. Such a conductive path permits the electrical energy associated with a lightning strike to be rapidly dissipated across the protected surface, which helps minimize damage to the surface of the aircraft component at the lightning strike point.

Airworthiness certification authorities have established standards for lightning strike protection for various types of aircraft and aircraft components. Based upon the probability of a lightning strike to a particular portion of an aircraft and the probable intensity of the electrical energy generated by such a strike, authorities have designated various potential strike zones for each type of aircraft and the probable current waveforms that structures and systems within each zone must withstand without substantial damage. Authorities designate these different strike zones as Zones 1A and 1B, Zones 2A and 2B, and Zone 3. These various strike zone designations are described in U.S. Pat. No. 5,417,385 and SAE ARP 5414, for example, and are understood by persons skilled in the art.

Composite aircraft components which are classified as Zone 1A require the greatest degree of lightning strike protection. SAE ARP 5416 sets forth lightning strike test procedures for certifying Zone 1A aircraft components. In order to satisfy the requirements of SAE ARP 5416, a test panel that replicates the structure of the Zone 1A component must withstand an artificially produced lightning strike having a specified current wave form without penetration through the test panel.

Current lightning strike protection systems for non-metal composite aircraft structures typically comprise a lightning strike protection surface film that includes a metal foil or mesh that is disposed on or proximate to an external surface of the composite structure to facilitate the distribution and dissipation of electrical energy generated by a lightning strike on the protected surface. For example, a metal foil or mesh can be embedded within a thin layer of a polymeric material that is disposed on a surface of a composite structure. One process for bonding a metal foil or mesh on a surface of a laminated composite structure for lightning strike protection is described in U.S. Pat. No. 5,470,413, for example. Alternatively, a metal foil or mesh can be incorporated into a surface portion of a laminated composite structure as the structure is fabricated. For example, U.S. Pat. No. 5,417,385 describes fabricating a laminated composite structure with a metal foil or mesh disposed proximate to its outer surface. In order to provide a smooth and aerodynamic outer surface for painting, a thin polymeric surface layer can be provided over the surface film containing the metal foil or mesh.

One common type of lightning strike protection includes an aluminum foil or mesh that is disposed on or proximate to the external surface of a protected composite structure. In one example, an aluminum foil or mesh that is capable of satisfactorily protecting a Zone 1A component has an areal weight density of about 0.02 pounds per square foot or about 74 grams per square meter (gsm). The term "areal weight density" is commonly associated with thin materials such as fabric, tape, foils and the like, and is well known among persons skilled in the art. As used herein, "areal weight density" refers to the weight of the material divided by its area (for example, length times width of a rectangular piece) of the material. The total areal weight density of conventional lightning strike protection systems (aluminum foil or mesh, polymer matrix, and a fiberglass corrosion isolation layer) can be about 0.11 pounds per square foot or about 500 gsm, or less.

Though an aluminum foil or mesh like that described above has proven to be effective for lightning strike protection for Zone 1A components, such a metal foil or mesh can add undesired weight to an aircraft. In addition, differences in the coefficients of thermal expansion (CTEs) between the metal foil or mesh and the polymers and reinforcement materials to which it is attached can introduce thermal stresses in the individual constituents. As a result, the protected surface can become prone to microcracking when subjected to repeated variations in ambient temperature routinely experienced by aircraft during service. At high altitudes, an aircraft (including its external components) is often exposed to relatively low ambient temperatures, whereas on the ground, the aircraft is exposed to relatively high ambient temperatures. These cyclic variations in temperature can be substantial. When a metal foil or mesh and the surrounding polymeric material have different CTEs, such variations in temperature can induce differential thermal expansion between the metal and the associated composite structure, and the resulting thermal stresses can cause microcracks to form in the surface of the composite structure. Such microcracks are undesirable as they can permit the ingress of moisture or chemicals into the composite structure and cause the structure to degrade.

Aircraft manufacturers and their suppliers are continually looking for ways to reduce the weight of their product for a number of reasons, including greater range per unit of fuel and/or greater fuel efficiency. Accordingly, there is a need for an improved surface film for lightning strike protection for Zone 1A aircraft components that is lighter in areal weight density than known surface films that include metal foils or screens. In particular, there is a need for an improved surface film for lightning strike protection of Zone 1A components that has an areal weight density less than about 500 gsm. In addition, there is a need for improved durability of the surface film for Zone 1A lightning strike protection, and for one that is less likely to be prone to surface microcracking than surface films that include metal foils or screens.

SUMMARY OF THE INVENTION

In one embodiment, an aircraft component having an external surface includes a lightning strike protection surface film disposed on or proximate to the external surface. The surface film can include preform in a polymer matrix. The preform includes a substrate having a first areal weight density and a plurality of spaced carbon nanotubes grown on the substrate, the nanotubes having a second areal weight density. The sum of the first areal weight density and the second areal weight density can be less than about 500 gsm, and the preform can have a surface resistance less than about 1 ohm/square.

In another embodiment, a lightning strike protection surface film includes a substrate having a first areal weight density and a plurality of spaced carbon nanotubes grown on the substrate, the nanotubes having a second areal weight density. The sum of the first areal weight density and the second areal weight density can be less than about 500 gsm, and the substrate with grown-on nanotubes can have a surface resistivity less than about 1 ohm/square.

Another embodiment of the invention includes a method of producing an aircraft component with lightning strike protection. The method can include providing an aircraft component having an outer surface portion, forming a lightning strike protection surface film by providing a substrate having a first areal weight density and growing on the substrate a plurality of spaced carbon nanotubes having a second areal weight density, and bonding the lightning strike protection surface film to the outer surface portion to form the aircraft component with lightning strike protection. The method can further include selecting the composition and first areal weight density of the substrate and controlling the second areal weight density of the carbon nanotubes such that the sum of the first areal weight density and the second areal weight density is less than about 500 gsm, and such that the substrate with grown-on nanotubes has a surface resistivity less than about 1 ohm/square.

An additional embodiment includes a composite aircraft component having at least one layer comprising a woven or non-woven substrate and a plurality of carbon nanotubes grown on the substrate. The substrate with grown-on carbon nanotubes can provide structural reinforcement to the composite aircraft component, and in addition or alternatively, can provide at least some level of lightning strike protection.

An additional embodiment includes a fiber reinforced composite surface film on the aircraft component comprising carbon fibers in a resin matrix. The carbon fibers in the said surface film have a length greater than at least about 6 mm and include carbon nanotubes grown on the fibers, and the nanotubes are substantially uniformly distributed on the fibers and have a length between about 1 and 100 microns.

These and other aspects and features of the invention will be understood from a reading of the following detailed description.

BRIEF DESCRIPTION OF THE DRAWINGS

FIG. 1 illustrates carbon nanotubes grown on a substrate according to various embodiments.

DETAILED DESCRIPTION

An improved surface film for lightning strike protection of Zone 1A, Zone 2A and 2B, and Zone 3 aircraft components is described below, and has a lighter areal weight density than conventional surface films that include metal foils or meshes. Such an improved surface film is also less likely to be prone to surface microcracks than a surface film that includes a metal foil or mesh.

In one embodiment, a surface film for lightning strike protection is disposed on or proximate to an external surface of an aircraft component. As used herein, the phrase "proximate to" means at or near a surface, wherein a film disposed proximate to a surface is located at or near the surface. In one embodiment, an electrically conductive surface film is not more than about 0.5 millimeter (mm) from the external surface of the structure. The surface film can include a substrate having a plurality of carbon nanotubes ("CNTs") grown on the substrate. The surface film can include a substrate having a plurality of carbon nanotubes grown on the substrate, where the carbon nanotubes can be single wall carbon nanotubes (SWCNTs), double wall carbon nanotubes (DWCNTs), multiwall carbon nanotubes (MWCNTs), or any combination thereof. Alternatively, the carbon nanotubes may be substituted by, or combined with, carbon nanofibers (CNFs). Hereinafter the terms "CNTs" and "carbon nanotubes" are meant to include carbon nanotubes, carbon nanofibers and combinations of carbon nanotubes and carbon nanofibers, and the terms "grown-on CNTs" and "grown-on carbon nanotubes" are meant to include carbon nanotubes, carbon nanofibers and combinations of carbon nanotubes and carbon nanofibers grown on the substrate. Preferably, the substrate is constructed of materials that have relatively low electrical resistivities. Alternatively, substrates that have relatively high electrical resistivities may be used in certain applications where lesser degrees of lightning strike protection are adequate. The substrate and grown-on CNTs combine to form a substantially flexible and electrically conductive preform. As used herein, the term "preform" refers to a substrate with a plurality of CNTs grown on the substrate.

The CNTs can be grown on the substrate using a process like that described in International Application No. PCT/US2007/011577, filed May 15, 2007, for example, or by a process like that described in "Electrical Properties of Hybrid Woven Composites Reinforced with Aligned Carbon Nanotubes" by N. Yamamoto et al., 49th AIAA/ASME/ASCE/AHS/ASC Structures, Structural Dynamics, and Materials Conference, Apr. 7-10, 2008, Schaumburg, Ill. ("Yamamoto"), for example. The disclosures of International Application No. PCT/US2007/011577 and Yamamoto are hereby incorporated by reference in their entireties. As described in PCT/US2007/011577, one method of growing CNTs on the substrate can include functionalizing the surface of the substrate by exposing the surface to an oxidizing gas, and then forming catalysts on the surface of the substrate by immersing the substrate in a catalyst solution. Referring to FIG. 1, for example, carbon nanofibers 100 are shown on carbon fiber substrates which were surface treated by gas oxidation. As shown, thick and aligned carbon nanotube structures were observed on the carbon fiber substrates. Alternatively, catalysts can be formed on the surface by subjecting the substrate to electrodeposition. Chemical vapor deposition can then be used to facilitate the growth of the CNTs on the surface of the substrate. When electrodeposition is used to form the catalysts on the substrate, the process can include a reductant such as sodium hypophosphite, for example. The oxidizing gas can be selected from ozone, carbon dioxide, and mixtures thereof, for example. The substrate can be exposed to the oxidizing gas at a temperature of between about 100° C. and 900° C. Where the oxidizing gas comprises ozone, the substrate can be exposed at a temperature of between about 100° C. and about 200° C., and where the oxidizing gas comprises carbon dioxide, the substrate can be exposed at a temperature of between about 400° C. and about 900° C. The catalyst solution can include a water or alcohol solution and soluble salts selected from salts of iron, molybdenum, nickel, cobalt, and combinations thereof, for example. The substrate can be dried after immersing the substrate in the solution and before subjecting the substrate to chemical vapor deposition to form the CNTs. Chemical vapor deposition can take place at a temperature between about 600° C. and about 900° C., and can utilize a hydrocarbon gases selected from acetylene, ethylene, methane, and combinations thereof. The areal weight density of the CNTs grown on the substrate can be closely controlled by controlling the reaction time during chemical vapor deposition. The aforementioned process yields a preform comprising a substrate with grown-on CNTs that are substantially uniformly distributed over the external surfaces of the substrate such that the grown-on CNTs form a substantially continuous network of CNTs that is coextensive with the substrate. In one embodiment, a substantial portion of the grown-on CNTs touch or are within about 5 microns of at least one other grown-on CNT. For example, at least about 75 percent of the grown-on CNTs can touch or be within about 5 microns of at least one other grown-on CNT.

Each of the grown-on CNTs can include a first end that, for substantially each CNT is attached to at least a portion of the substrate, and an opposed second end that generally extends away from the first end and the substrate. The CNTs can be generally straight or can have a generally helical shape or another shape. The lengths of the grown-on CNTs can be from about 5 microns to about 100 microns, or more preferably, can be between about 10 microns and about 40 microns, and the diameters of the grown-on CNTs can be from about 1 nanometer (nm) to about 200 nm. The morphology of the grown-on CNTs can vary from bulky and entangled, to loose bundles, to random and helical. In one embodiment, the preform comprising the substrate with grown-on CNTs is sufficiently flexible to conform to a curved surface like that commonly found on exterior surfaces of an aircraft (including its various components). In another embodiment, a thin layer of an electrically conductive metal such as nickel, copper, gold, silver, platinum or the like can be deposited on the substrate, or alternatively, on the preform, i.e., both the substrate and the grown-on CNTs, to reduce the structure's electrical resistivity, such as by electroplating, physical vapor deposition, or the like. The thickness of the deposited metal layer can be from about 0.001 microns to about 50 microns, for example.

In one embodiment, the preform can be embedded within a polymeric resin to form a lightning strike protection surface film. When cured, the polymeric resin binds the preform constituents, namely the substrate and the grown-on CNTs, in a fixed position on or proximate to a surface of a component or structure. In one embodiment, the preform can be impregnated with an epoxy or thermoplastic resin of a type commonly used to fabricate composite aircraft structures, and the resulting surface film can be incorporated on or adjacent to the surface of a composite structure during lay up of the composite structure using fabrication methods known in the art. In one embodiment, the preform is positioned within about 0.5 mm of the protected external surface of the composite structure. If the external surface of the composite structure is to be painted in order to provide the surface with a smooth and aesthetically pleasing appearance, the preform can be located within about 0.5 mm (or less) of the surface before paint is applied to the surface. The surface film can be cured together with other portions of the composite structure using known methods such that the surface film is disposed on or proximate to an external surface of the cured structure. In another embodiment, the preform can be infused or impregnated with a polymeric resin, the resin can be cured to form a durable sheet or film, and the sheet or film can be bonded onto an external surface of an aircraft component for lightning strike protection. For example, the preform can be embedded within a polyurethane film, and the resulting flexible surface film can be bonded to an external surface of a composite structure with an adhesive or the like. After bonding, the preform is located proximate to an outermost surface of the structure. In one embodiment, the preform can be sized with an epoxy before embedding the preform within a polymeric film. The epoxy sizing helps keep the grown-on CNTs attached to the substrate during shipment or handling and/or promotes bonding during fabrication.

In one embodiment, the areal weight density of the substrate and the areal weight density of the grown-on CNTs is selected and controlled such that the areal weight density of the preform, that is the combined areal weight densities of the substrate and the grown-on CNTs, is less than or equal to the combined areal weight density of a metal foil or mesh and its associated fiberglass isolation layer, and is capable of providing lightning strike protection for a Zone 1A aircraft component. For example, when compared to an aluminum foil or mesh and an associated fiberglass isolation layer having a combined areal weight density of about 500 gsm, the combined areal weight densities of the substrate and the grown-on CNTs can be limited or controlled to be less than about 500 gsm. Specific areal weight densities for various embodiments that include different preforms are discussed below. Test results suggest a correlation between the resistivity of surface films made in accordance with the invention and the lightning strike criteria of the SAE ARP 5416 specification. A surface film that includes a preform having a surface resistivity less than about 1 ohm/square correlates with the Zone 2A test requirements of SAE ARP 5416, and a surface film in accordance with the invention and having a surface resistivity less than about 0.5 ohm/square may meet the Zone 1A test requirements of SAE ARP 5416. As used herein, surface resistivity is the surface resistivity measured using a four point probe method, as is known in the art, such as the method set forth in ASTM F390-Standard Test Method for Sheet Resistance of Thin Metallic Films with a Collinear Four-Probe Array, for example (hereinafter "the four point probe method"). As discussed in detail below, the invention includes various embodiments of lightning strike protection surface films that include preforms that may be capable of providing Zone 1A or Zone 2A lightning strike protection for aircraft components, and have areal weight densities that are less than the areal weight densities of comparable surface films that include metal foils or screens (i.e. less than about 500 gsm).

In one embodiment, the substrate can be a braided fabric, woven fabric, or non-crimp fabric constructed of elongated yarns formed of electrically conductive fibers. The structure of the fabric substrate can be substantially similar to braided, woven or non-crimp fabric commonly used as reinforcements in composite aircraft structures, for example. The electrically conductive fibers can be carbon fibers (such as standard modulus carbon fibers, high modulus carbon fibers, heat treated carbon fibers, metal coated carbon fibers, and the like), or can be CNT reinforced polyacrylonitrile (PAN) carbonized fibers (CNTs within the PAN fibers). The invention is not limited to carbon fibers, and can be applied to other electrically conductive fibers known to those skilled in the art, for example silicon carbide fibers. The areal weight density of the braided, woven or non-crimp fabric substrate can be about 70 gsm to about 400 gsm. A plurality of CNTs can be grown on the substrate as described above, and can have an areal weight density of about 2 gsm to about 100 gsm. The combined areal weight densities of the braided, woven or non-crimp fabric substrate and the grown-on CNTs can be less than about 500 gsm. The substrate and the grown-on CNTs provide an electrically conductive preform for use in providing lightning strike protection to an external surface of a composite structure, such as a composite aircraft structure. When used for Zone 1A lightning strike protection, one embodiment of a preform comprising the braided, woven or non-crimp fabric substrate and the grown-on CNTs can have a surface resistivity less than about 0.5 ohm/square when measured by the four-point probe method described above. When used for Zone 2A lightning strike protection, for example, the preform can have a surface resistivity less than about 1 ohm/square.

In another embodiment, the substrate can be a braided, woven or non-crimp fabric constructed of elongated yarns or fibers formed of a first plurality of CNTs, such as by wet, dry, melt, gel or electro-spinning, for example. Preferably, the first plurality of CNTs that form the fibers includes CNTs having lengths greater than about 6 mm. In this embodiment, the areal weight density of the braided, woven or non-crimp fabric substrate can be about 15 gsm to about 200 gsm. A second plurality of CNTs can be grown on the substrate as described above, and can have an areal weight density of about 2 gsm to about 100 gsm. In this embodiment, the combined areal weight densities of the woven/braided substrate and the grown-on CNTs can be less than about 300 gsm. When used for Zone 1A lightning strike protection, one embodiment of the preform comprising the braided, woven or non-crimp fabric substrate and the grown-on CNTs can have a surface resistivity less than about 0.5 ohm/square when measured by the four-point probe method. When used for Zone 2A lightning strike protection, for example, the preform can have a surface resistivity less than about 1 ohm/square.

Another embodiment includes a non-woven mat, scrim or veil constructed of electrically conductive fibers as the substrate. The substrate can include either continuous fiber strands or chopped fiber strands. When the substrate includes chopped fiber strands, the fibers preferably have lengths greater than about 6 mm. The electrically conductive fibers can be carbon fibers (such as standard modulus carbon fibers, high modulus carbon fibers, heat treated carbon fibers, metal coated carbon fibers, and the like), or can be CNT reinforced polyacrylonitrile (PAN) carbonized fibers (CNTs within the PAN fibers), silicon carbide fibers or other electrically conductive fibers. The areal weight density of the substrate is preferably between about 70 gsm to about 400 gsm. A plurality of CNTs can be grown on the substrate as described above, and can have an areal weight density of about 2 gsm to about 100 gsm. The areal weight densities of the preform or the combined areal weight densities of the substrate and the grown-on CNTs, can be less than about 500 gsm. When used for Zone 1A lightning strike protection, one embodiment of a preform comprising the substrate and the grown-on CNTs can have a surface resistivity less than about 0.5 ohm/square when measured using the four-point probe method. When used for Zone 2A lightning strike protection, for example, the preform can have a surface resistivity less than about 1 ohm/square.

In another embodiment, the substrate includes a non-woven mat, veil or scrim containing fibers formed of a first plurality of CNTs, such as by wet, dry, melt, gel or electro-spinning, for example. Preferably, the first plurality of CNTs that form the fibers includes CNTs having lengths greater than about 6 mm. In this embodiment, the areal weight density of the mat, veil or scrim substrate can be about 15 gsm to about 200 gsm. Optionally, a second plurality of CNTs may be grown on the substrate as described above, and can have an areal weight density of about 2 gsm to about 100 gsm. In this embodiment, the combined areal weight densities of the mat or scrim substrate and the grown-on CNTs can be less than about 300 gsm. When used for Zone 1A lightning strike protection, one embodiment of the preform comprising the mat or scrim substrate, with or without the grown-on CNTs, can have a surface resistivity less than about 0.5 ohm/square when measured using the four-point probe method. When used for Zone 2A lightning strike protection, for example, the preform can have a surface resistivity less than about 1 ohm/square.

Another embodiment includes a CNT paper as the substrate. Preferably, a first plurality of CNTs forming the paper substrate includes CNTs having lengths greater than about 6 mm. In this embodiment, the areal weight density of the CNT paper substrate can be about 15 gsm to about 200 gsm. Optionally, a second plurality of CNTs may be grown on the CNT paper substrate as described above, and can have an areal weight density of about 2 gsm to about 100 gsm. In this embodiment, the combined areal weight densities of the CNT paper substrate and the grown-on CNTs can be less than about 300 gsm. When used for Zone 1A lightning strike protection, one embodiment of a preform comprising the CNT paper substrate, with or without the grown-on CNTs, can have a surface resistivity less than about 0.5 ohm/square when measured using the four-point probe method. When used for Zone 2A lightning strike protection, for example, the preform can have a surface resistivity less than about 1 ohm/square.

Though the substrates and the grown-on CNTs as described above are inherently electrically conductive, to satisfy the requirements of certain lightning strike applications, the preform can be subjected to a heat-treatment step to obtain further improvement in electrical conductivity. The preform can be heat-treated in a vacuum or in an inert atmosphere, for example argon, nitrogen, and the like, and at temperatures of between about 600° C. and 1,800° C. for times ranging from about 0.25 to 24 hours. When used for Zone 1A lightning strike protection, a preform after the heat-treatment step can have a surface resistivity less than about 0.5 ohm/square when measured using the four-point probe method. When used for Zone 2A lightning strike protection, for example, the preform can have a surface resistivity less than about 1 ohm/square.

Though the substrates described above are constructed of materials that are highly electrically conductive, for certain applications, a lightning protection surface film according to the invention can also include a substrate constructed of a material or materials having relatively low electrical conductivity. As described above, different aircraft components require different degrees of lightning strike protection. Though a lightning strike protection surface film for a Zone 1A component may require an electrically conductive substrate, a non-conductive substrate with grown-on CNTs may provide a conductive path that is sufficient to adequately dissipate lower levels of electrical energy for a Zone 2A, Zone 2B or Zone 3 aircraft component or for a non-aircraft component such as a wind turbine blade, for example. In such applications, the substrate may include a woven or braided fiberglass fabric, for example, which can be less costly than the electrically conductive substrates described above.

An additional embodiment includes a woven or expanded metal screen as the substrate. The woven or expanded metal screen can be constructed of copper, aluminum, bronze, or the like. In one embodiment, the metal screen can have an areal weight density of about 40 gsm to about 400 gsm. A plurality of CNTs can be grown on the substrate as described above. In one embodiment, the grown-on CNTs can have an areal weight density of about 2 gsm to about 100 gsm. The combined areal weight densities of the woven or expanded metal screen and the grown-on CNTs can be less than about 500 gsm. When used for Zone 1A lightning strike protection, the preform comprising the woven or expanded metal screen and the grown-on CNTs can have a surface resistivity less than about 0.5 ohm/square when measured by the four-point probe method. When used for Zone 2A lightning strike protection, for example, the preform can have a surface resistivity less than about 1 ohm/square.

A preform comprising a substrate with grown-on CNTs as described above can be infused or impregnated with a thermoplastic or epoxy resin by hot melt or solution coating using methods known in the art, and can be laid up with the composite structure into which the substrate is being incorporated using known methods. Known liquid molding techniques such as resin film infusion, resin transfer molding, and vacuum assisted resin transfer molding can also be used to incorporate the preform into an external surface portion of a composite structure. The thermoplastic or epoxy resin occupies voids within the substrate and between the grown-on CNTs of the preform. The preform can be used as a single surface layer, or two or more preform layers can be incorporated into a composite structure in overlapping layers located on or proximate to the surface of the structure. In order to provide a smooth and aerodynamic outer surface and to minimize the possibility of surface microcracking, a polymeric material such as a polymeric adhesive can be applied over the lightning strike protection surface film. In addition, a layer of paint of a type commonly used for aircraft and aircraft components can be applied over the external surface of the structure without impeding the ability of the preform to adequately distribute and dissipate electrical energy resulting from a lightning strike.

When the substrate is constructed of a non-metal material such as carbon fibers, CNT reinforced PAN carbonized fibers, CNTs, or fibers formed from CNTs, the lightning protection surface film can have a coefficient of thermal expansion (CTE) that is of the same order of magnitude as the in-plane CTE of the materials forming the associated composite structure. In one embodiment, the in-plane CTE of the surface film is within about 90 percent to about 100 percent of the in-plane CTE of the materials forming the associated composite structure. Accordingly, such a lightning strike protection surface film is substantially less likely to be prone to surface microcracking of a protected surface due to cyclic variations in temperature than a metal foil or screen having a substantially higher CTE. Even if the total areal weight density of the substrate and grown-on carbon nanotubes is equal to or only slightly less than a conventional metal foil or screen, a substantial benefit can be realized by minimizing the possibility of microcracking arising from the differential thermal expansion. For example, an aircraft component equipped with a lightning strike protection surface film according to the invention preferably is capable of withstanding about 2,000 thermal cycles between −65° F. and 160° F. without substantial microcracking of the component's external surface.

When the substrate is a woven or expanded metal screen constructed of copper, aluminum, bronze, or the like and treated with grown-on CNTs as described above, it can have a mass substantially less than metal screens of the type presently used in prior art lightning strike applications and still be capable of providing equivalent lightning strike protection. A lighter density metal screen substrate with grown-on carbon CNTs is likely to induce substantially lower stresses in adjoining composite materials due to differences in thermal expansion than a weightier metal screen, and thus, is less likely to be prone to surface microcracking due to differential thermal expansion than heavier density prior art metal screen systems.

In one embodiment, a film as described above can replace one or more structural prepreg plies in a laminated composite structure. In such an arrangement, the film can provide both lightning strike protection and structural reinforcement for the composite structure, or can be used only for structural reinforcement. Such a composite structure can include one or more layers of such films, and/or can include one or more film layers that are thicker and heavier than the surface films specifically described above. When used as a structural reinforcement layer in a composite structure, such a film may include a substrate with grown-on CNTs that has an areal weight density and/or a surface resistivity that exceeds the specific limits for areal weight density and/or surface resistivity describe above for other embodiments. Alternatively, a film as described above could be used for all plies in a laminated composite structure. In this embodiment, significant weight savings can be realized since the component does not need a separate lightning strike protection surface film.

In one embodiment, a fiber reinforced composite component with desirable properties can include one or more layers comprising carbon fibers in a resin matrix. The carbon fibers have a length greater than at least about 6 mm and include carbon nanotubes grown on the fibers as described above. The nanotubes are substantially uniformly distributed on the fibers and have a length between about 1 and 100 microns. Preferably, the layer(s) of carbon fibers with grown on carbon nanotubes is disposed near the outer surface of the composite component, most preferably within about 0.5 mm of the outer surface of the component. Most preferably, the carbon nanotubes are grown on the carbon fibers such that one nanotube is within about 5 microns of another nanotube for at least about 75 percent of the total number of nanotubes. Depending on the desired material characteristics of the component, it can comprise only one layer of carbon fibers with grown on nanotubes located on or proximate the external surface of the composite component, or the entire component can be fabricated from carbon fibers with grown on nanotubes, or the component can include any number of such carbon fiber layers between such range.

The films described above can be incorporated into or attached to substantially any type of structure requiring lightning strike protection and/or structural reinforcement. For example, such films can be incorporated into or attached to an aircraft engine nacelle, fuselage, wing or vertical tail, a helicopter rotor blade or other helicopter component, or components or portions of such structures. Additionally, they can be incorporated into or attached to other structures such as wind turbine blades and their support structures. Other uses will be apparent to those skilled in the art.

The above descriptions of various embodiments of the invention are intended to describe various aspects and features of the invention without limitation. Persons of ordinary skill in the art will understand that various changes and modifications can be made to the specifically described embodiments without departing from the scope of the invention. All such changes and modifications are intended to be within the scope of the appended claims.

The invention claimed is:

1. A fiber reinforced composite aircraft component comprising carbon fibers in a resin matrix, wherein the carbon fibers have a length greater than at least about 6 mm and include carbon nanotubes grown on the fibers, and the nanotubes are substantially uniformly distributed on the fibers and have a length between about 1 and 100 microns, and wherein the nanotubes decrease a surface resistance of the resin matrix.

2. The fiber reinforced composite aircraft component according to claim 1 wherein the component has an external surface and the carbon fibers form a layer, and the layer is positioned within at least about 0.5 mm of the external surface.

3. The fiber reinforced composite aircraft component according to claim 1 wherein at least about 75 percent of the grown-on carbon nanotubes touch or are within about 5 microns of another grown-on carbon nanotube.

4. An aircraft component having an external surface and including a lightning strike protection surface film disposed on or proximate to the external surface, the film comprising a non-woven mat, veil, scrim or paper substrate of electrically conductive carbon nanotube fibers, the carbon nanotube fibers having lengths greater than about 6 mm, and a plurality of carbon nanotubes grown on the carbon nanotube fibers, wherein the plurality of carbon nanotubes decrease a surface resistance of the film.

* * * * *